United States Patent
Xu et al.

(10) Patent No.: US 8,417,294 B2
(45) Date of Patent: Apr. 9, 2013

(54) METHOD AND SYSTEM FOR PROVIDING DATA SERVICES IN A HYBRID NETWORK

(75) Inventors: Jianming Xu, Plano, TX (US); Jyoti Boppana, Plano, TX (US); Mahbubul Alam, Dallas, TX (US); Ghassan Naim, Garland, TX (US); Pardeep Kohli, Plano, TX (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 10/509,312

(22) PCT Filed: Mar. 27, 2003

(86) PCT No.: PCT/US03/09678
§ 371 (c)(1), (2), (4) Date: Sep. 27, 2004

(87) PCT Pub. No.: WO03/084251
PCT Pub. Date: Oct. 9, 2003

(65) Prior Publication Data
US 2005/0163069 A1 Jul. 28, 2005

Related U.S. Application Data

(60) Provisional application No. 60/368,285, filed on Mar. 27, 2002.

(51) Int. Cl.
*H04M 1/00* (2006.01)

(52) U.S. Cl.
USPC .......................... 455/560; 455/552.1

(58) Field of Classification Search .... 455/552.1–553.1, 455/560
See application file for complete search history.

(56) References Cited

U.S. PATENT DOCUMENTS

| | | | |
|---|---|---|---|
| 5,970,059 A | 10/1999 | Ahopelto et al. | |
| 6,104,929 A * | 8/2000 | Josse et al. | 455/445 |
| 6,608,832 B2 | 8/2003 | Forslow et al. | |
| 6,690,929 B1 | 2/2004 | Yeh | |
| 6,721,555 B1 * | 4/2004 | Phillips et al. | 455/411 |
| 2002/0160785 A1 * | 10/2002 | Ovesjo et al. | 455/453 |
| 2003/0002525 A1 * | 1/2003 | Grilli et al. | 370/465 |
| 2003/0103478 A1 * | 6/2003 | Eriksson | 370/335 |
| 2003/0112779 A1 * | 6/2003 | Parekh et al. | 370/335 |
| 2003/0112785 A1 * | 6/2003 | Jain et al. | 370/342 |
| 2003/0188319 A1 * | 10/2003 | Weissman | 725/106 |

FOREIGN PATENT DOCUMENTS

WO WO 99/66740 12/1999

OTHER PUBLICATIONS

3GPP, Apr. 2004, ETSI TS 123 060 V3.3.0.*
The Point-to-Point Protocol (PPP), RFC 1661 IETF, Jul. 1994, p. ii.*

* cited by examiner

*Primary Examiner* — Steven Lim
(74) *Attorney, Agent, or Firm* — Hitt Gaines, PC

(57) ABSTRACT

A method and system is disclosed for providing data services to a wireless mobile in a hybrid network.

19 Claims, 16 Drawing Sheets

US 8,417,294 B2

METHOD AND SYSTEM FOR PROVIDING DATA SERVICES IN A HYBRID NETWORK

BACKGROUND OF THE INVENTION

The present invention relates generally to wireless voice and data communications, and more particularly, to a wireless system and method for providing data services to a wireless mobile in a hybrid network.

SUMMARY OF THE INVENTION

A method and system is described for providing data services to a wireless mobile in a hybrid network.

DESCRIPTION OF THE PREFERRED EMBODIMENT

Figure 1:
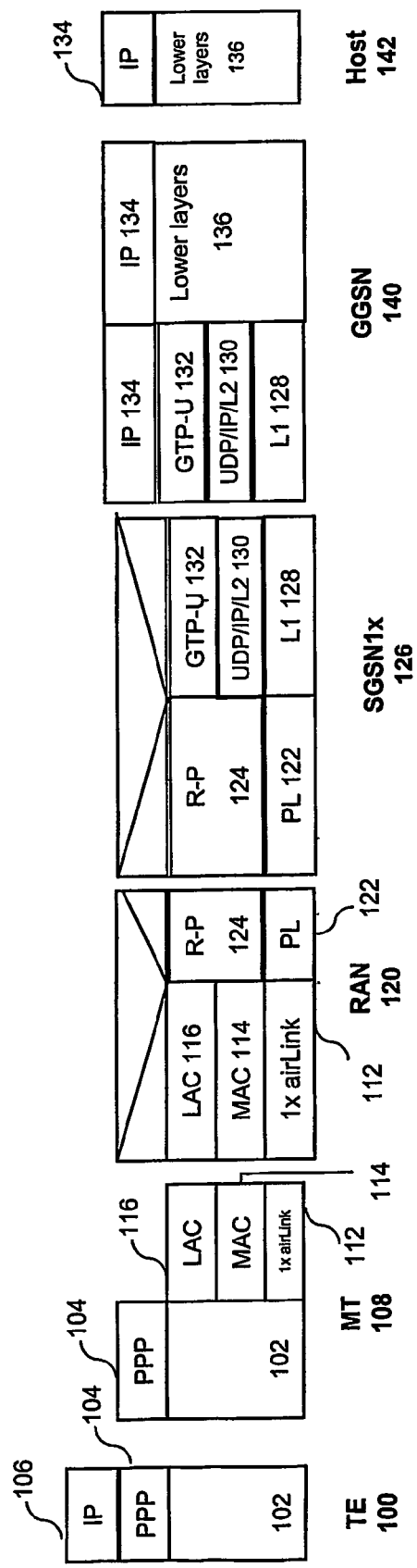
FIG. 1 illustrates an end-to-end user plane protocol stack in the Hybrid network with transparent access to the Internet.

For the purposes of illustrating the method and system described in this disclosure, various acronyms are used, and the definitions of which are listed below:

| | |
|---|---|
| 3GPP2 | Third Generation Partnership Project Number 2 |
| ANSI-41 | American National Standards Institute - Cellular Radio Telecommunications Intersystem Operations |
| APN | Access Point Name |
| BSC | Base Station Centre |
| BSS | Base Station System |
| BTS | Base station Transceiver System |
| CN | Core Network |
| CDMA | Code Division Multiple Access |
| COA | |
| DHCP | Dynamic Host Configuration Protocol |
| FA | Foreign Agent |
| GGSN | Gateway GPRS Service Node |
| GMSC | Gateway MSC |
| GPRS | General Packet Radio Service |
| GSM | Global System for Mobile communications |
| GTP-C | GPRS Tunneling Protocol - Control part |
| GTP-U | GPRS Tunneling Protocol - User part |
| HA | Home Agent |
| HLR | Home Location Register |
| IP | Internet Protocol |
| IPCP | IP Control Protocol |
| IS41 | Wireless Network conforming to the IS41 standard |
| IE | Information Element |
| ISDN | Integrated Services Digital Network |
| ISUP | ISDN User Part (of SS7) |
| L1 | Layer 1 |
| L2 | Layer 2 |
| L2TP | Layer 2 Tunneling Protocol |
| LAC | L2TP Access Concentrator |
| MAC | Multiple Access Control |
| MIP | Mobile IP |
| MSC | Mobile Switching Centre |
| MT | Mobile Temination |
| NSAPI | Network Service Access Point Identifier |
| PCF | Packet Control Function |
| PCO | Protocol Configuration Options |
| PDN | Packet Data Network |
| PDP | Packet Data Protocol |
| PL | Physical Layer |
| PPP | Point to Point Protocol |
| PSTN | Public Switch Telephone Network |
| QoS | Quality of Service |
| RADIUS | Remote Authentication Dial In User Service |
| RAN | Radio Access Network |
| R-P | Radio Packet |
| SGSN | Serving GPRS Service Node |
| SMS | Short Message Service |
| SMS-C | Short Message Service Centre |
| SS7 | Signaling System No.7 |
| T1 | Digital communication line that uses time division multiplexing with an overall transmission rate of 1.544 million bits per second. |
| TCH | Traffic Channel |
| TCP/IP | Transmission Control Protocol/Internet Protocol |
| TEID | Terminal Equipment Identification |
| UDP | User Data Protocol |

The present disclosure provides several examples below, and it is understood that the examples are not necessarily limitations to the present disclosure, but are used to describe embodiments of the method and system of the present disclosure.

A typical wireless network is composed of two sub-networks: a Radio Access Network (RAN) which handles radio related issues such as assigning radio resources to a mobile terminal (or "mobile" in short) upon request for services, and a Core Network (CN) which links the mobile user to wireline networks. Current specification of wireless networks require that the RAN and CN have the same wireless technology in order to provide wireless services. These networks may be referred to as "homogeneous networks." For instance, a GSM mobile will only operate in a wireless network which its RAN and CN are both GSM wireless technology based. A hybrid network refers to a wireless network with its CN and RAN using different technologies. For example, the RAN may be based on CDMA2000 standard, while the CN may be based on GSM technology. Detailed description of a Hybrid Network can be found in co-pending PCT patent application serial no. PCT/US02/35500 which was filed on Nov. 5, 2002 and entitled "Method and System for Providing Wireless Services in a Composite Wireless Network Comprising at Least One Access Network and One Core Network of Different Technologies.", assigned to the same assignee and is hereby incorporated by reference.

In view of the need to provide data services in a hybrid network, the present invention illustrates a pioneering method and system for providing a wireless user data services in such a network.

FIG. 1 illustrates the end-to-end user plane protocol stack solution for the Hybrid network with transparent access to the internet. A terminal (TE) or user 100 is shown to have a protocol stack of lower layers 102, a Point to Point layer 104 and an Internet Protocol (IP) layer 106. The PPP signaling from TE 100 terminates at a General Packet Radio Service (GPRS) handset also referred to as mobile terminal (MT) 108. The MT 108 also includes lower layer 102 and PPP layer 104. In addition, the MT 108 also includes a 1x airlink 112, a MAC layer 114 and a LAC layer 116.

The MT 108 in turn communicates with a Radio Access Network (RAN) 120 that also includes a 1x airlink 112, a MAC layer 114 and a LAC layer 116. In addition, the RAN 120 includes a PL layer 122 and a R-P layer 124.

The RAN 120 in turn communicates with a Serving General Packet Radio Service (GPRS) Serving Node (SGSN) 126. The SGSN 126 is a Hybrid SGSN that links the CDMA RAN to the GPRS Core Network. The SGSN 126 also includes a PL layer 122 and a R-P layer 124 as well as a L1 layer 127, a UDP/IP/L2 layer 130 and a GTP-U layer 132.

The SGSN 126 in turn communicates with a Gateway GPRS Serving/Support Node (GGSN) 140. The GGSN 140 also includes a L1 layer 127, a UDP/IP/L2 layer 130 and a GTP-U layer 132 as well as lower layers 136 and an IP layer 134.

The GGSN 140 in turn communicates with a Host 142 that includes lower layers 136 and an 1P layer 134. While the communications from the TE 100 through the MT 108 and the RAN 120 is based on 3GPP2 P.S0001v1.0, the remainder of the communication in this figure is based upon 3GPP TS 29.061 v. 4.0.0.

Figure 2:
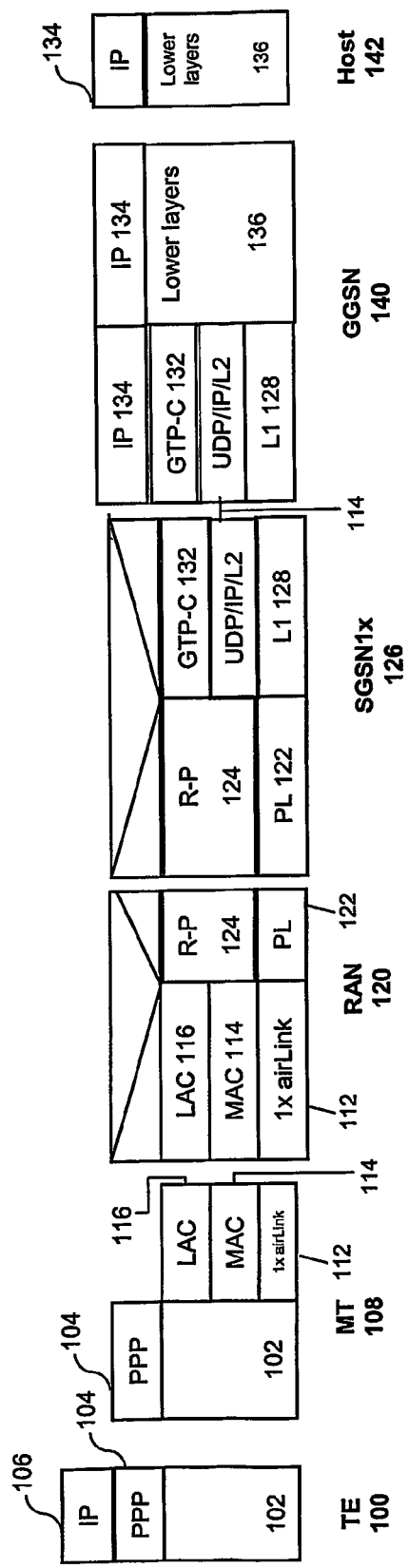
FIG. 2 illustrates an end-to-end signaling plane protocol stack in the Hybrid network with transparent access to the Internet.

FIG. 2 illustrates the end-to-end signaling plane protocol stack solution for the Hybrid network with transparent access to the internet. Although the elements in this figure are similar to FIG. 1, the IP layer 134 is also used for the GGSN 140 to communicate utilizing DHCP and RADIUS protocols.

Figure 3:
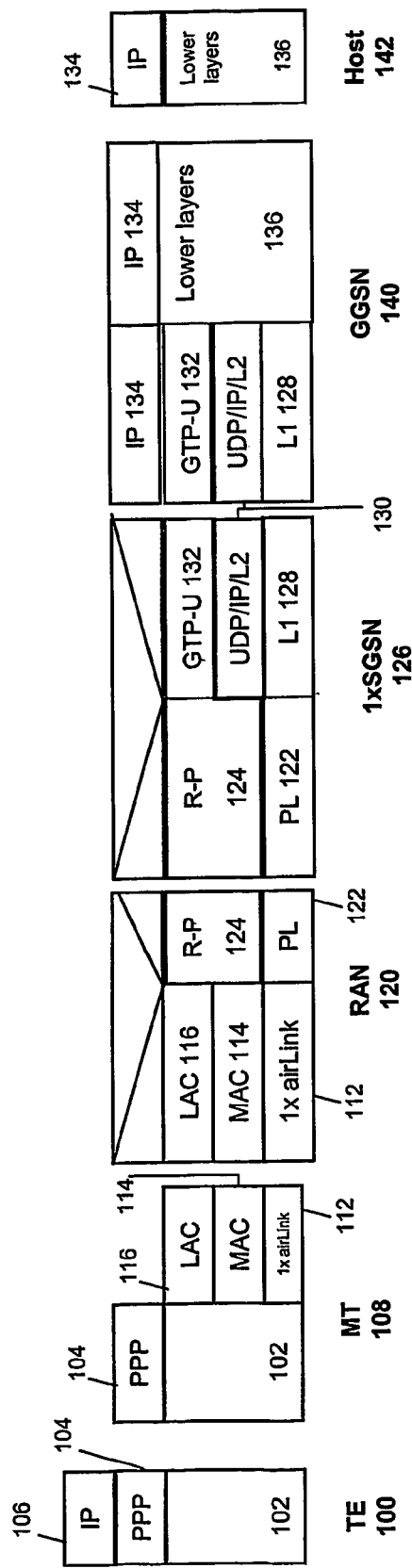
FIG. 3 illustrates an end-to-end user plane protocol stack in the Hybrid network with non-transparent access to the Internet or an Internet Service Provider.

FIG. 3 illustrates the end-to-end user plane protocol stack solution for the Hybrid network with non-transparent access to the Internet or an Internet Service Provider. The elements of this figure are also similar to FIG. 2, except that this figure is a user plane instead of a signaling plane.

Figure 4:
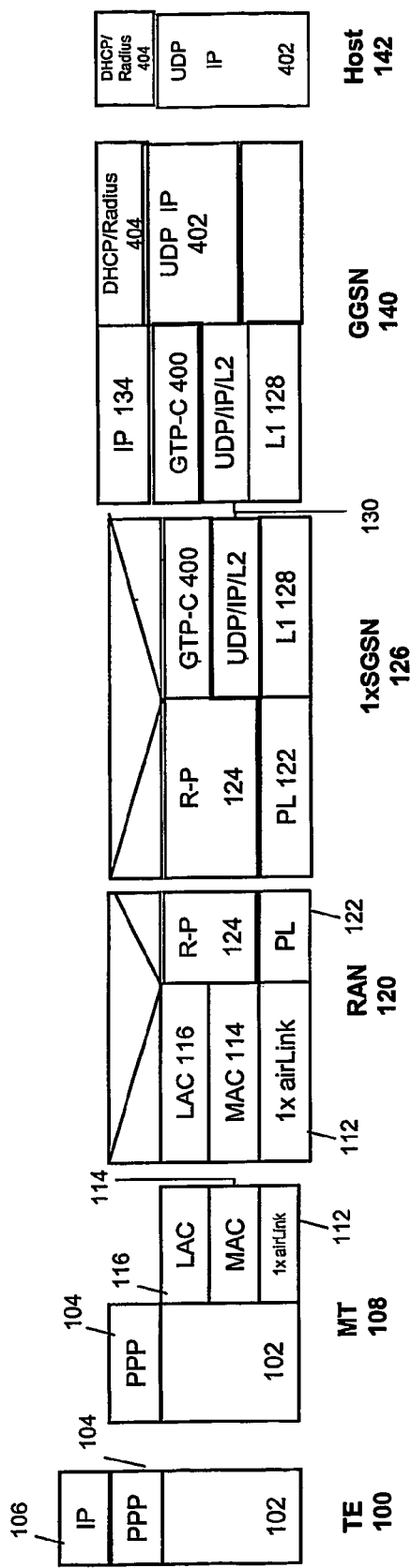
FIG. 4 illustrates an end-to-end signaling plane protocol stack in the Hybrid network with non-transparent access to the Internet or Internet Service Provider (ISP)

FIG. 4 illustrates the end-to-end signaling plane protocol stack solution for the Hybrid network with non-transparent access to the Internet or Internet Service Provider (ISP). Although most of the elements in this figure are also similar to FIG. 3, the DHCP/RADIUS layers 404 replace FIG. 3's IP layers. In addition, FIG. 4 also includes a UDP IP layer 402 in both the GGSN 140 and the Host 142. Mover, GGSN 140 and SGSN 126 include GTP-C layer 400.

Figure 5:
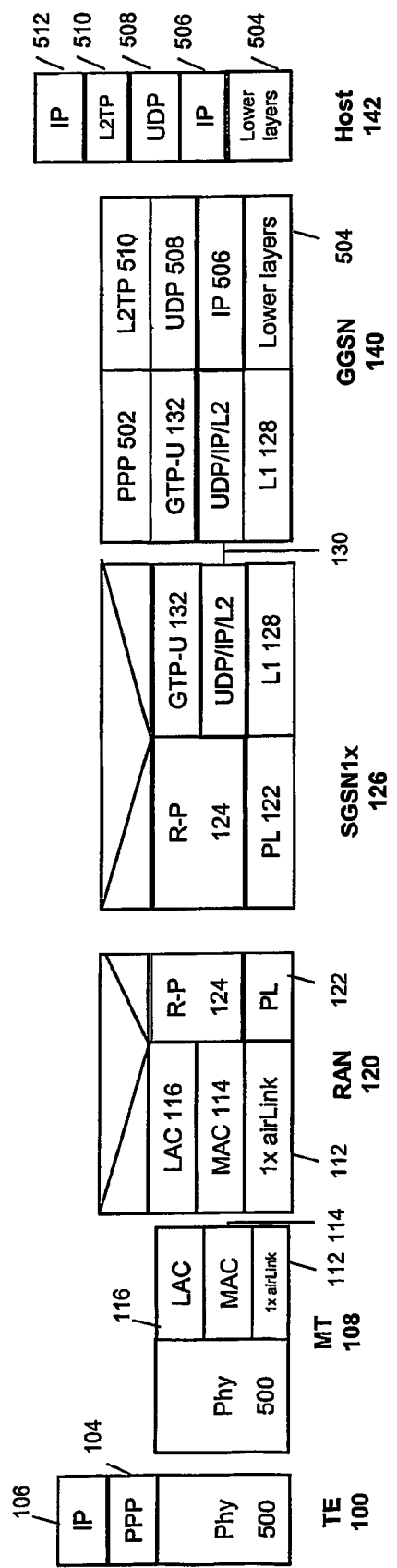
FIG. 5 illustrates an end-to-end user plane protocol stack in the Hybrid network with inter-working with a Packet Data Network (PDN) with Point to Point (PPP) protocol for dial-up access to the Internet.

FIG. 5 illustrates the end-to-end user plane protocol stack solution for the Hybrid network with inter-working with a Private Data Network (PDN) with Point to Point (PPP) protocol for dial-up access to the Internet. Although some elements are similar in this figure to FIG. 4, the TE 100 has a physical layer 500 that connects to MT 108 physical layer 500. In addition, the PPP layer 104 utilizes an IPCP protocol configuration and passes that configuration from the TE 100 to the SGSN via an ADDS message. Moreover, the SGSN 126 and the GGSN 140 also include a GTP-U 132 layer. Furthermore, the GGSN 140 includes a PPP 502 layer, lower layers 504, IP layer 506, UDP layer 508, L2TP layer 510 and additional IP layer 512.

Figure 6:
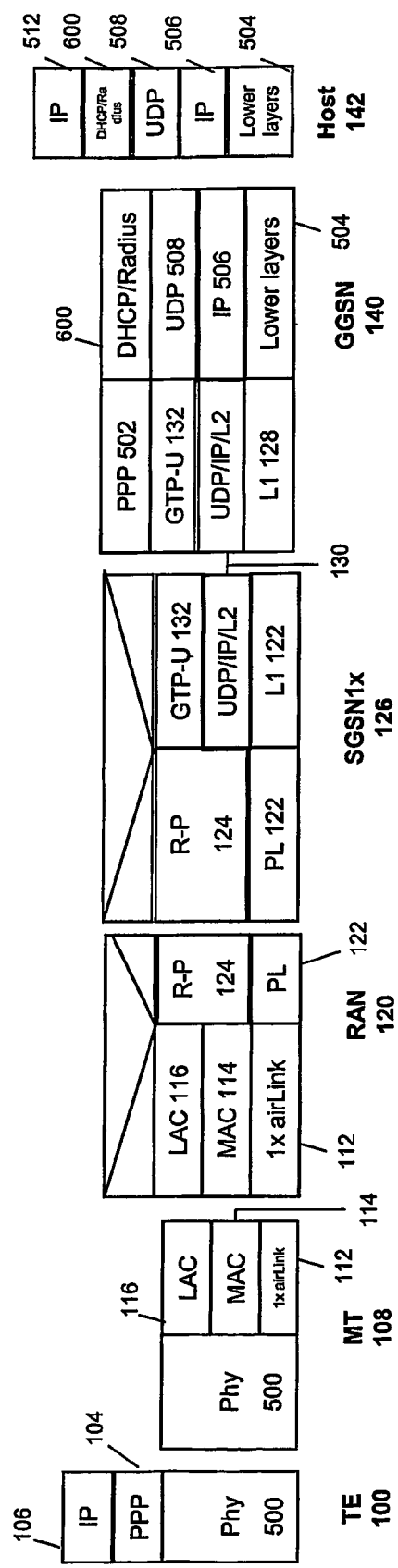
FIG. 6 illustrates an end-to-end user plane protocol stack for in the Hybrid network with inter-working with a PDN with PPP protocol for Internet Protocol (IP) based Intranets and ISPs.

FIG. 6 illustrates the end-to-end user plane protocol stack solution for the Hybrid network with inter-working with a PDN with PPP protocol for Internet Protocol (IP) based Intranets and ISPs. Although FIG. 6 is also similar to FIG. 5, FIG. 6 also includes a DHCP/RADIUS layer 600 in the GGSN 140 that communicates with DHCP/RADIUS layer 600 in the Host 142.

Figure 7:
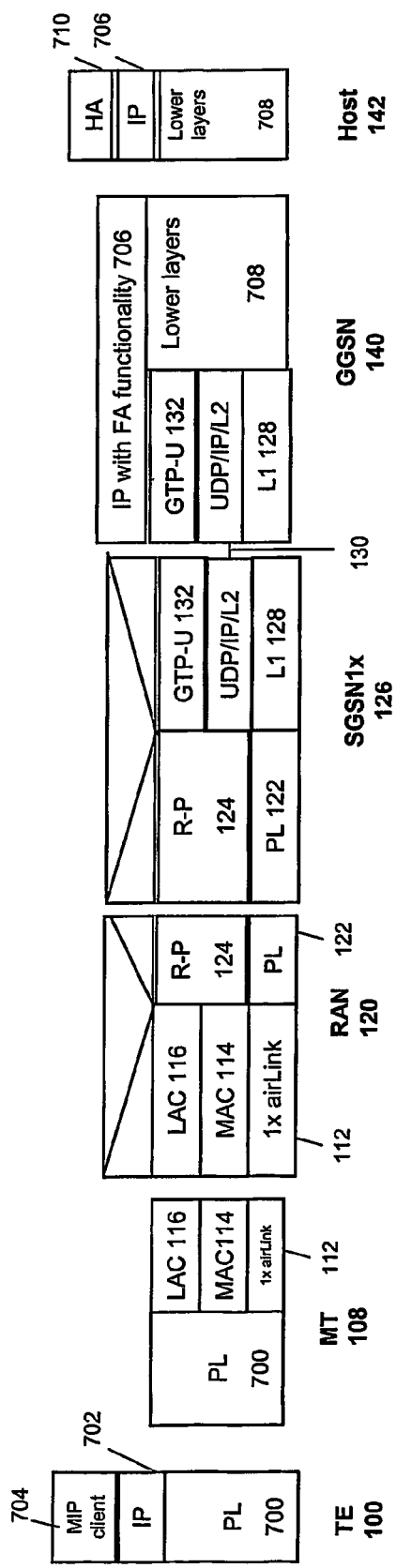
FIG. 7 illustrates an end-to-end user plane protocol stack in the Hybrid network using with inter-working with a PDN with Mobile IP v.4.

FIG. 7 illustrates the end-to-end user plane protocol stack solution for the Hybrid network with inter-working with a PDN for Mobile IP v. 4. This embodiment starts with a PL layer 700, an IP layer 702 and a MIP client 704 at the TE 100. In addition, the MT 108 also contains a PL layer 700. Moreover, this embodiment also has an IP layer 706 with FA functionality as well as lower layers 708 in the GGSN 140 and the Host 142. Further, the Host also includes a HA layer 710.

Figure 8:
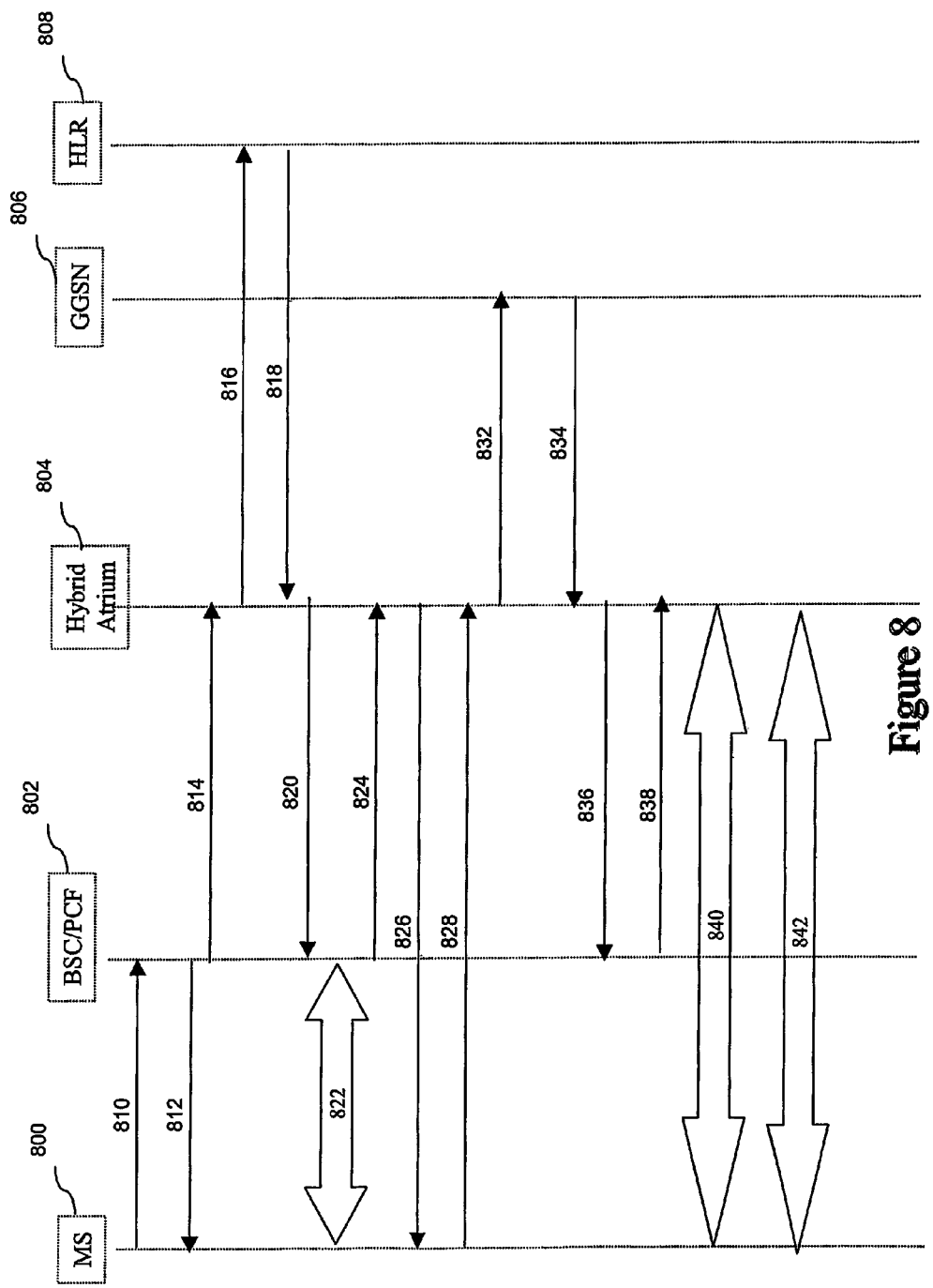
FIG. 8 is a call flow diagram of a data session activation where the Mobile Station (MS) initiates the activation.

FIG. 8 is a call flow diagram of a data session activation where the Mobile Station (MS) 800 initiates the activation of the data session. First, an origination message 810 is sent from the MS 800 to the BSC/PCF 802. The BSC/PCF 802 then sends a base station acknowledgment order 812 to the MS 800. The BSC/PCF also sends out a CM service Request (that includes the service option) 814 to a Hybrid Atrium 804. The Hybrid Atrium 804 then sends an Update Location Request 816 to a HLR 808. The HLR 808 then sends an Insert Subscriber Data (QoS) 818 to the Hybrid Atrium 804. In turn, the Hybrid Atrium 804 then sends an Assignment Request (QoS) 820 to the BSC/PCF 802. The Traffic Channel (TCH) setup procedure 822 is then initiated between the MS 800 and the BSC/PCF 802. An A11-Registration Request (lifetime, QoS) 824 is then sent to the Hybrid Atrium 804 by the BSC/PCF 802. The Hybrid Atrium 804 then sends an SMS("send PDP Info") message 826 to the MS 800. In turn, the MS 800 sends an SMS(APN,PCO IEB) (APN is Access Point Network and PCO is Protocol Configuration Options) message 828 to the Hybrid Atrium 804. These messages 826 and 828 makes use of the Short Message Service to send requests to the MS 800 and to carry GPRS specific information on the CDMA1X Radio Access Network (RAN) from the mobile MS 800 to the Hybrid Atrium 804 located in the Core Network.

The Hybrid Atrium 804 then sends a Create PDP Context Request message 832 with QoS, APN and PCO information to the GGSN 806. The GGSN 806 then sends a Create PDP Context Response 834 with Cause="Request Accepted" to the Hybrid Atrium 804. The Hybrid Atrium 804 then sends an A11-Registration Reply (Lifetime, Accept) message 836 to the BSC/PCF 802. The BSC/PCF 802 then sends an Assignment Complete message 838 to the Hybrid Atrium 804. A PPP connection 840 is then established between the Hybrid Atrium 804 and the MS 800 that allows User Data Transmission 842 between the two nodes 800 and 804.

Figure 9:
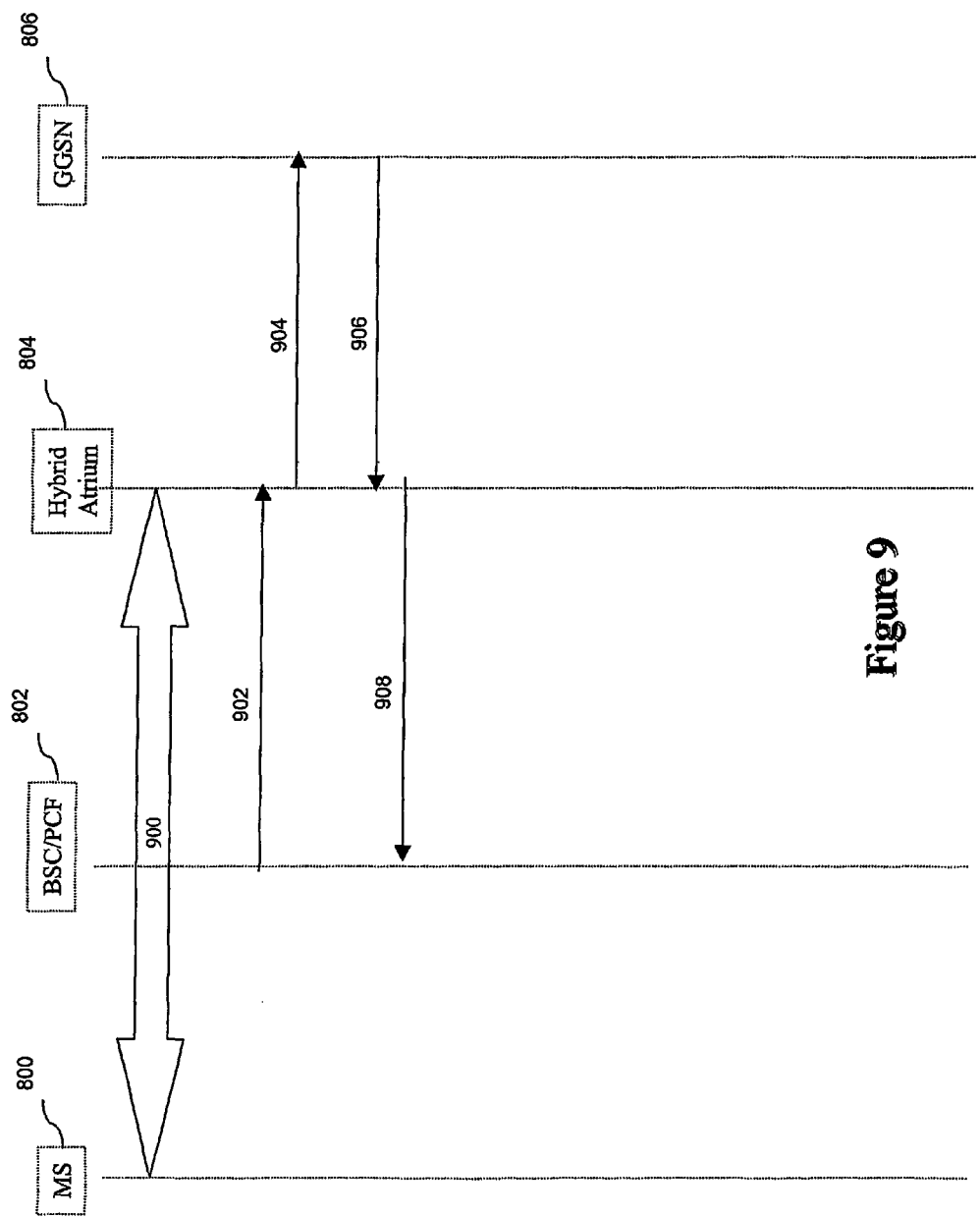
FIG. 9 is a call flow diagram of a data session context update where the MS initiates the update.

FIG. 9 is a call flow diagram of a data session context update where the MS initiates the update. First, a PPP connection 900 is established between the MS 800 and the Hybrid Atrium 804. An A11-Registration Request(Lifetime, Accounting Data update) message 902 is then sent from the BSC/PCF 802 to the Hybrid Atrium 804. An Update PDP Context Request(QoS Profile) message is then sent from the Hybrid Atrium 804 to the GGSN 806. The GGSN 806 then sends an Update PDP Context Response(Cause='Request Accepted') message 906 back to the Hybrid Atrium 804. The Hybrid Atrium 804 then sends an A11-Registration Reply (Lifetime, Accept) message 908 back to the BSC/PCF 802.

Figure 10:
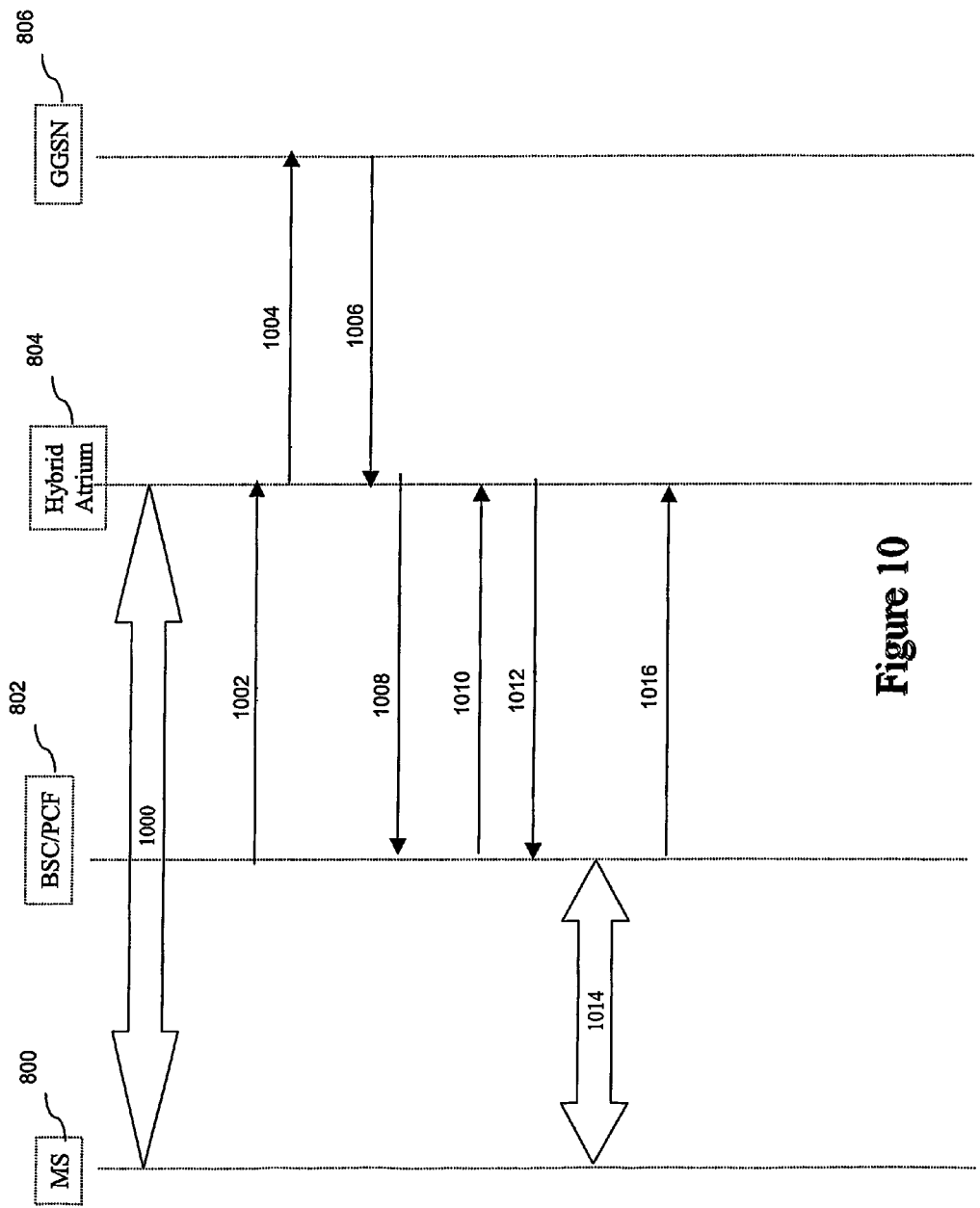
FIG. 10 is a call flow diagram of a data session termination where the MS initiates the termination.

FIG. 10 is a call flow diagram of a data session termination where the MS 800 initiates the termination. First, a PPP connection 1000 is established between the MS 800 and the Hybrid Atrium 804. The BSC/PCF 802 then sends an A11-Registration Request(Lifetime=0) message 1002 to the Hybrid Atrium 804. The Hybrid Atrium 804 in turn sends a Delete PDP Context Request message 1004 to the GGSN 806. The GGSN 806 responds by sending a Delete PDP Context Response message 1006 with Cause='Request Accepted' to the Hybrid Atrium 804. The Hybrid Atrium 804 then sends an A11-Registration Reply(Lifetime, Accept) message 1008 to the BSC/PCF 802. The BSC/PCF 802 then sends a Clear Request message 1010 to the Hybrid Atrium 804, which in turn responds with a Clear Command message 1012 to the BSC/PCF 802. A TCH Release 1014 is then initiated between the MS 800 and the BSC/PCF 802. Once the TCH release 1014 is executed, the BSC/PCF 802 sends a Clear Complete message 1016 to the Hybrid Atrium 804.

Figure 11:
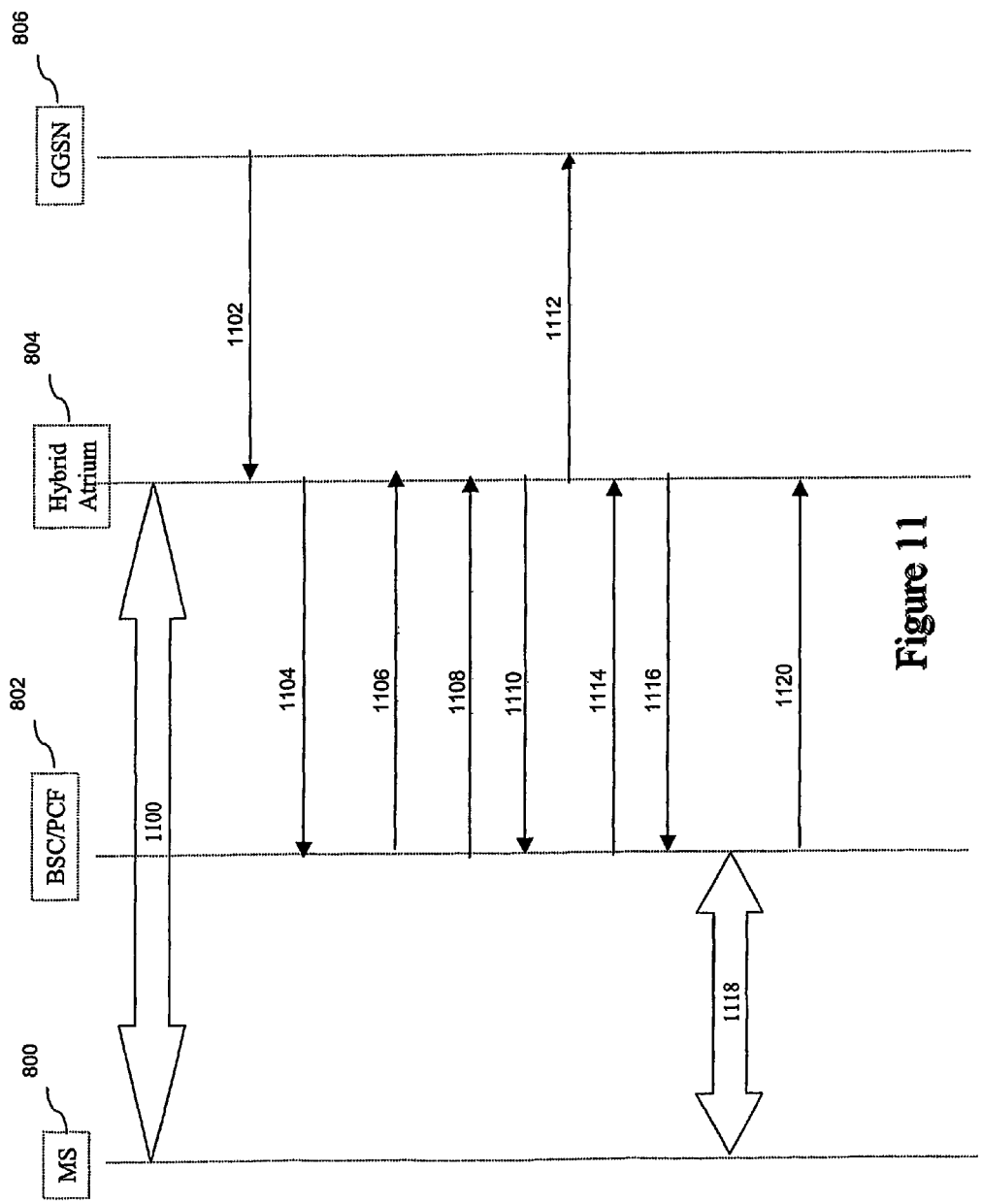
FIG. 11 is a call flow diagram of a data session termination where the network initiates the termination.

FIG. 11 is a call flow diagram of a data session termination where the network initiates the termination. First, a PPP connection 1100 is established between the MS 800 and the Hybrid Atrium 804. The GGSN 806 sends a Delete PDP Context Request message 1004 to the Hybrid Atrium 804. The Hybrid Atrium 804 sends an A11-Registration Update message 1104 to the BSC/PCF 802. The BSC/PCF 802 then sends an A11-Registration Acknowledgement message 1106 and a A11-Registration Request(Lifetime=0) message 1108 to the Hybrid Atrium 804. The Hybrid Atrium 804 then sends an A11-Registration Reply(Lifetime, Accept) message 1110 to the BSC/PCF 802. In addition, the Hybrid Atrium 804 sends a Delete PDP Context Response message 1112 with Cause='Request Accepted' to the GGSN 806. Moreover, the BSC/PCF 802 then sends a Clear Request message 1114 to the Hybrid Atrium 804, which in turn responds with a Clear Command message 1116 to the BSC/PCF 802. A TCH Release 1118 is then initiated between the MS 800 and the B902. Once the TCH release 1118 is executed, the BSC/PCF 802 sends a Clear Complete message 1120 to the Hybrid Atrium 804.

Figure 12:
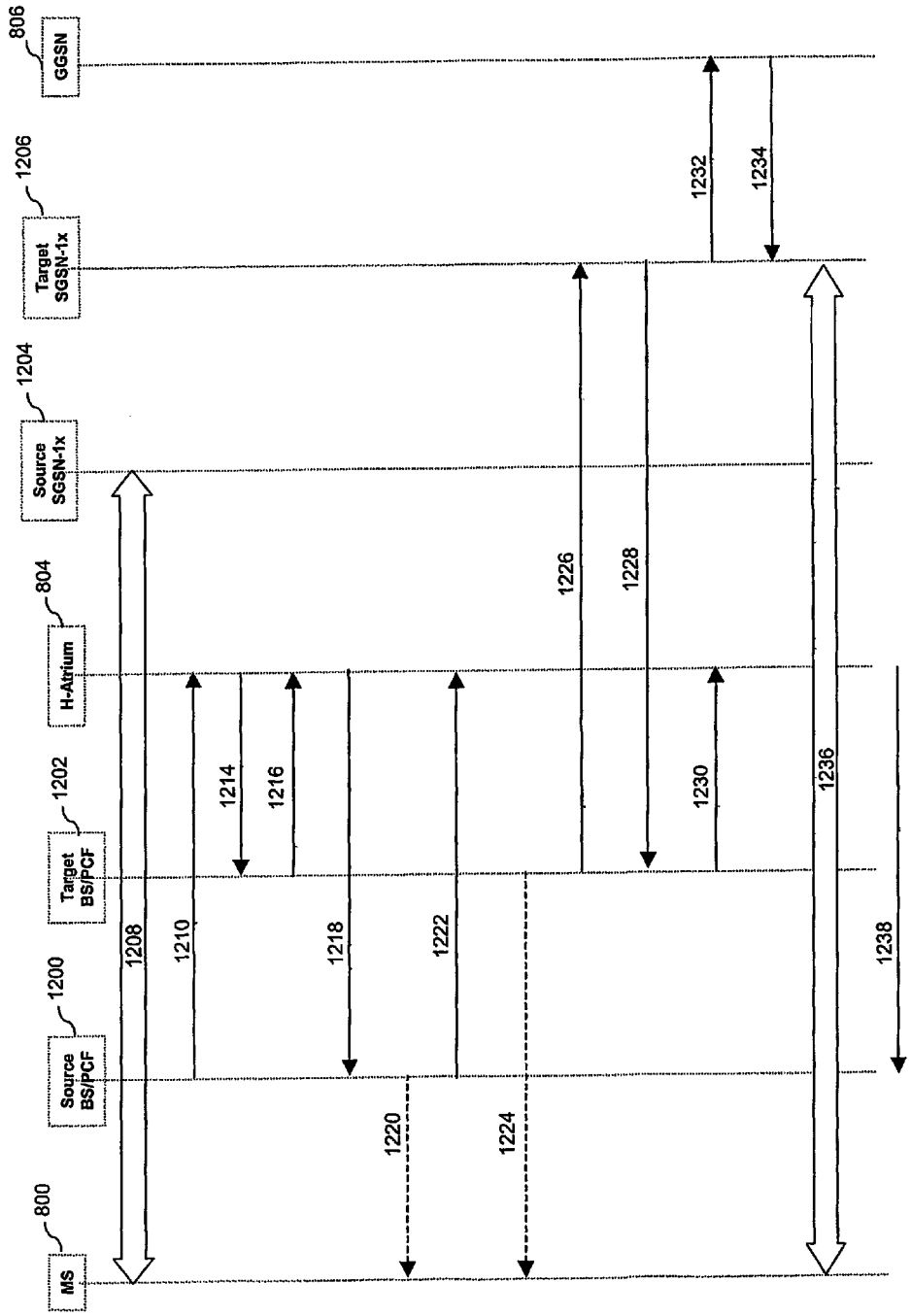
FIG. 12 is a call flow diagram of a inter Packet Data Service Node (PDSN) hand-off in H-1xRTT protocol.

FIG. 12 is a call flow diagram of a inter Packet Data Serving Node (PDSN) hand-off using a H-1xRTT protocol. First, MS 800 establishes a user data transfer 1208 with a Source SGSN 1204. A Source BS/PCF 1200 then sends a Hand-off Request 1214 to the Hybrid Atrium 804. The Hybrid Atrium 804 then responds with a Hand-off Request Acknowledgment 1216. The Hybrid Atrium 804 then sends a Hand-off Command 1218 to the Source BS/PCF 1200 which in turn sends an Extended/General Hand-off Direction message 1220 to the MS 800. The Source BS/PCF 1200 then sends an Hand-off Commenced message 1222 to the Hybrid Atrium 804. Meanwhile, a Target BS/PCF 1202 sends a BS Acknowledgement Order 1224 to the MS 800 and a A11 Registration Request (HA, HAA, Lifetime, MEI) message 1126 to a Target SGSN 1206. In turn, the Target SGSN 1206 sends an A11 Registration Reply(HA, HAA, Lifetime, Accept, DAI) message 1228 to the Target BS/PCF 1202. The Target BS/PCF 1202 then sends a Hand-off complete message 1230 to the Hybrid Atrium 804. The Target SGSN 1206 then sends an Update PDP Context Request 1232 to the GGSN 806, and the GGSN 806 responds with an Update PDP Context Res message 1234. The MS then sends user data 1236 back and forth to and from the Target SGSN 1206 for the duration of the session. A clear command message 1238 is then sent from the Hybrid Atrium 804 to the Source BS/PCF 1200.

Figure 13:
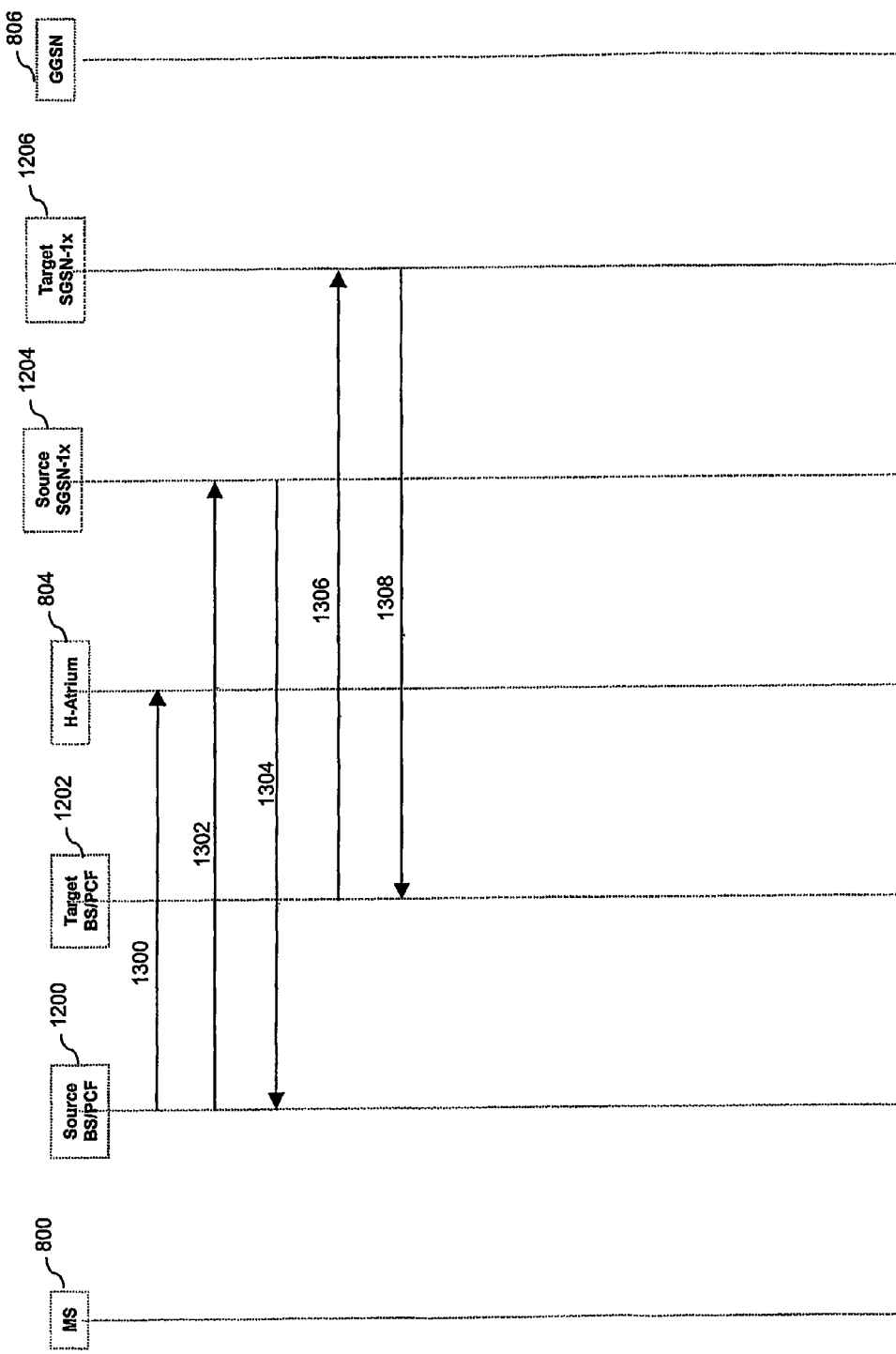
FIG. 13 is a call flow continuation of FIG. 12.

Now turning to FIG. 13, the call flow is continued from FIG. 12. The Source BS/PCF 1200 then sends a Clear Complete message 1300 to the Hybrid Atrium 804. In addition, the Source BS/PCF 1200 sends a A11 Registration Req(HA, HAA, COA, Lifetime=0) message 1302 to the Source SGSN 1204. In turn, the Source SGSN 1204 sends an A11 Registration Reply(HA, HAA, Lifetime=0, Accept) message 1304 to the Source BS/PCF 1200. The Target BS/PCF 1202 then sends a A11 Registration Req(HA, HAA, Lifetime) message 1306 to the Target SGSN 1206. The Target SGSN 1206 then sends an A11 Registration Reply(HA, HAA, COA, Lifetime, Accept) message back to the Target BS/PCF 1202.

Figure 14:
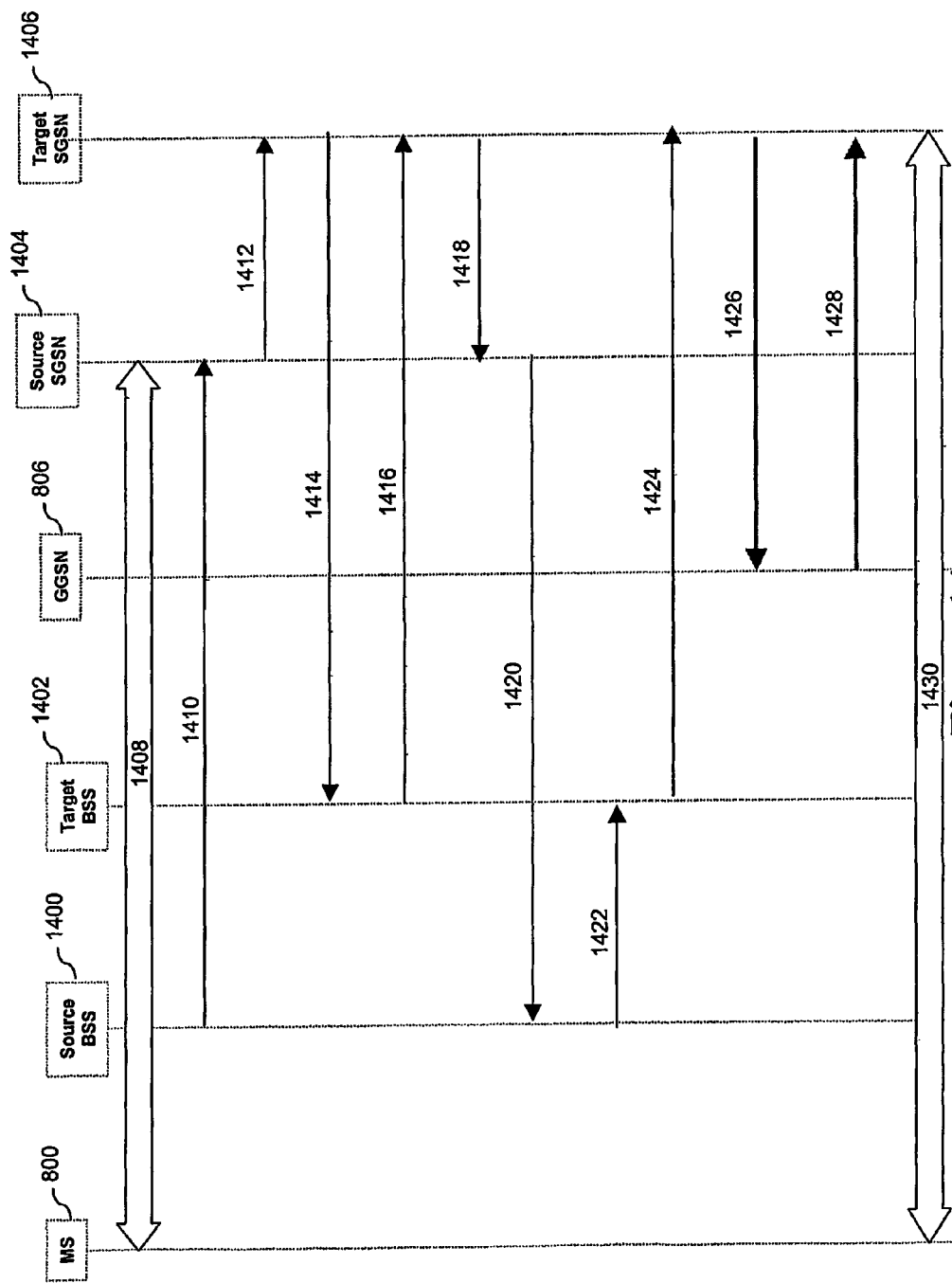
FIG. 14 is a call flow of an inter Serving GPRS Support Node (SGSN) hand-off.

FIG. 14 is a call flow of an inter Serving GPRS Support Node (SGSN) hand-off. The MS 800 first establishes an User Data Session 1408 with a Source SGSN 1404. In addition, a Source BSS 1400 sends a Relocation Required message 1410 to the Source SGSN 1404. In turn, the Source SGSN 1404 sends a Forward Relocation Req message 1412 to a Target SGSN 1406. The Target SGSN 1406 then sends a Relocation Request to the Target BSS 1402. The Target BSS-1402 then sends a Relocation Request Acknowledgement message 1416 to the Target SGSN 1406. The Target SGSN 1406 then sends a Forward Relocation Ack message 1418 to the Source SGSN 1404. The Source SGSN 1404 then sends a Relocation Command 1420 to the Source BSS 1400. The Source BSS 1400 then sends a Relocation Commit message 1422 to the Target BSS 1402. In turn, the Target BSS 1402 then sends a Relocation Detect 1424 to the Target SGSN 1406. The Target SGSN 1406 then sends an Update PDP Context Request (TEID for control and data, NSAPI, SGSN Control addresses, SGSN bearer address, QoS profile) message 1426 to the GGSN 806. The GGSN 806 then sends an Update PDP Context Response(Cause, GGSN address, QoS) message to the Target SGSN 1406. The MS 800 and the Target SGSN 1406 then exchange User Data 1430.

A table is now shown below that details the mapping of the Update PDP Context Request GPRS message in the GPRS Core Network to the the A11 Registration Request CDMA message in the Radio Access Network.

| Update PDP Context Req | A11 Registration Req | Comments |
| --- | --- | --- |
| Tunnel Endpoint Identifier Data | | Generated by SGSN |
| Tunnel Endpoint Identifier Control Plane | | Generated by SGSN |
| NSAPI | | Generated by SGSN |
| SGSN Address for Control Plane | | Generated by SGSN |
| SGSN Address for User Traffic | | Generated by SGSN |
| Quality of Service Profile | | Negotiated between SGSN, MS and GGSN |
| | Lifetime | PDSN can decide on lifetime |
| | Home address | MS IP Address |
| | Home Agent Address | GGSN address |
| | Care of Address | PDSN Assigned address |
| | Identification | For message req-ack mapping |
| | Session Specific Extension | Session ID |
| | Vendor Specific Extension | To identify appropriate PDSN |
| | Mobile home authentication extension | Marks end of the authentication data |

Figure 15:
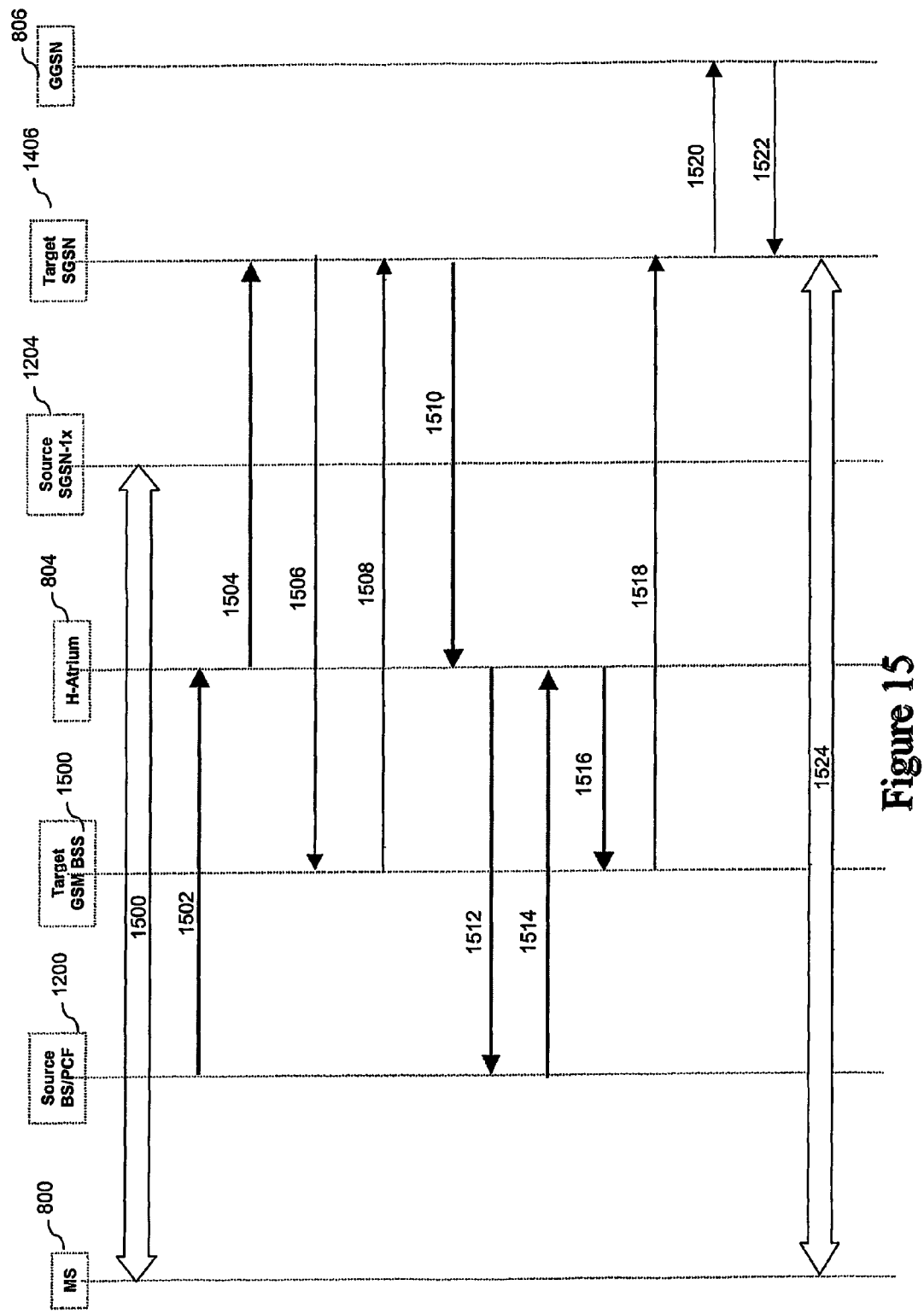
FIG. 15 is a call flow of a PDSN to SGSN hand-off.

FIG. 15 is a call flow of a PDSN to SGSN hand-off. First, a User data session 1500 is established between the MS 800 and the Source SGSN 1204. A Hand-off required message 1502 is then sent from the Source BS/PCF 1200 to the Hybrid Atrium 804. The Hybrid Atrium 804 in turn sends a Forward Relocation Request 1504 to the Target SGSN 1406. The Target SGSN 1406 then sends a Relocation Request 1506 to a Target GSM BSS 1500. The Target GSM BSS 1500 then sends a Relocation Request Ack message 1508 to the Target SGSN 1406. The Target SGSN 1406 then sends a Forward Relocation Ack message to the Hybrid Atrium 804. the Hybrid Atrium 804 then sends a Hand-off Command 1512 to the Source BS/PCF 1200. In turn, the Source BS/PCF 1200 then sends a Hand-off Commenced message 1514 to the Hybrid Atrium 804. The Hybrid Atrium 804 then sends a Relocation Commit message 1516 to the Target GSM BSS 1500. The Target GSM BSS 1500 in turn sends a Relocation Detect message 1518 to the Target SGSN 1406. The Target SGSN 1406 then sends an Update PDP Context Request message 1518 to the GGSN 806. The GGSN 806 then sends an Update PDP Context Response message 1522 back to the Target SGSN 1406. User data 1524 is then exchanged between the MS 800 and the Target SGSN 1406.

Figure 16:
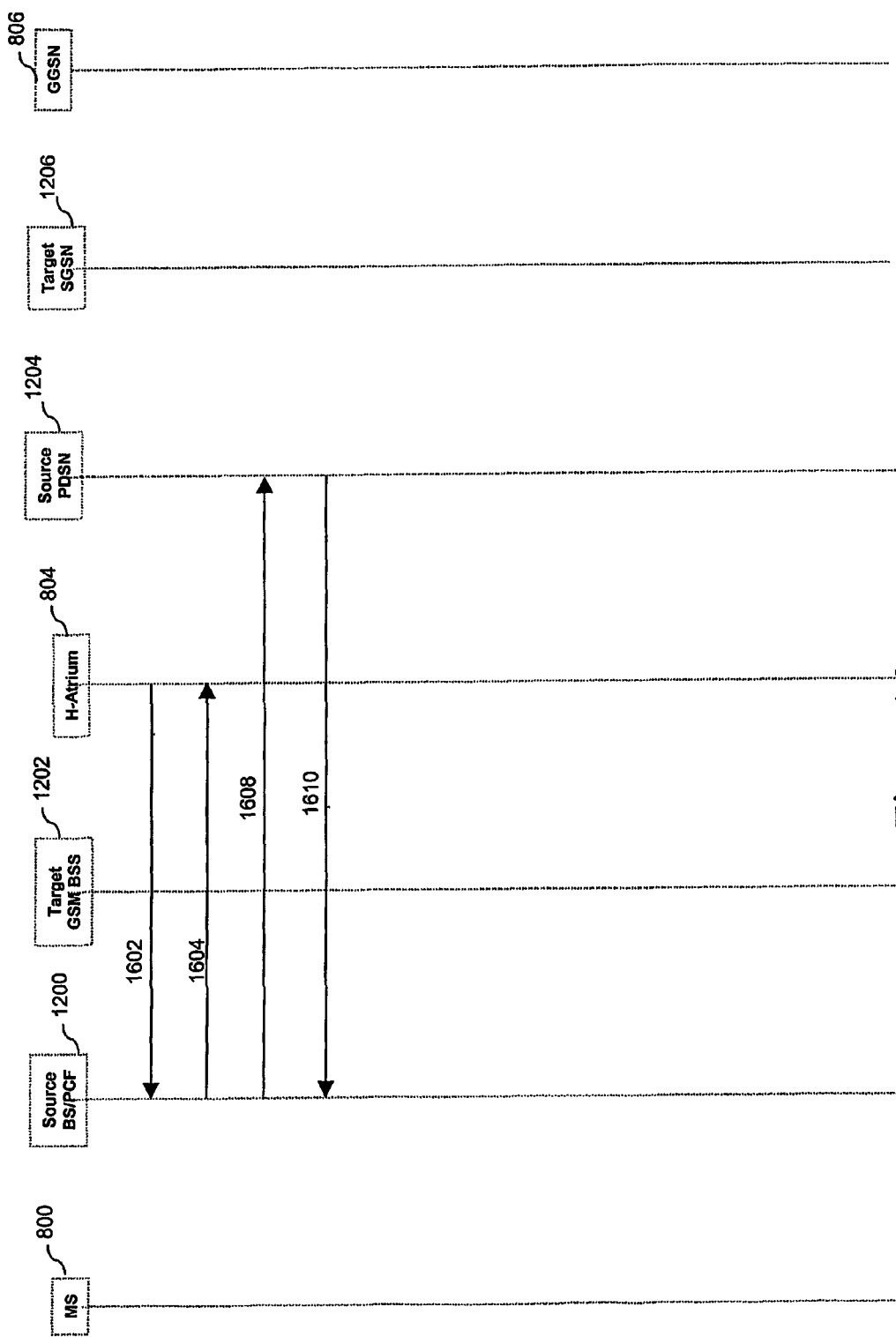
FIG. 16 is a call flow continuation of FIG. 15.

FIG. 16 is a call flow continuation of FIG. 15. When the Hybrid Atrium 804 decides to end the session, the Hybrid Atrium 804 sends a Clear Command message 1602 to the Source BS/PCF 1200. The Source BS/PCF 1200 then responds with a Clear Complete message 1604 back to the Hybrid Atrium 804. The Source BS/PCF 1200 also sends a A11 Registration Req(HA,HAA,COA, Lifetime=0) message to the Source PDSN 1204. The Source PDSN 1204 then sends an A11 Registration Reply(HA, HAA, Lifetime=0, Accept) message 1610 back to the Source BS/PCF 1200.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for providing data service in a hybrid network, wherein the hybrid network includes a Mobile Station (MS), a Radio Access Network (RAN) of a first technology and a Core Network (CN) of a second technology, the method comprising:
   facilitating an exchange of messages between the MS and the RAN of a first technology and between the RAN of a first technology and the CN of a second technology different than the first technology through a Hybrid Atrium located in the CN, wherein the Hybrid Atrium is a hybrid Serving GPRS Service Node and includes an ability to exchange short messages directly with the MS through a direct connection between the Hybrid Atrium and the MS and wherein the Hybrid Atrium is separate and apart from a Base Station Controller (BSC);
   employing the Hybrid Atrium to establish a Point to Point Protocol (PPP) connection directly between the Hybrid Atrium and the MS; and
   employing the Hybrid Atrium to establish user data transmission directly between the Hybrid Atrium and the MS.

2. The method of claim 1, wherein said facilitating an exchange of messages includes:
   receiving a data session initiation from the MS at the Hybrid Atrium through a Base Station Controller and wherein the first technology is CDMA2000 and the second technology is GSM;
   updating a Home Location Register (HLR) by the Hybrid Atrium;
   informing a Quality of Service (QoS) by the HLR; and
   negotiating a QoS by the Hybrid Atrium.

3. The method of claim 2, further including:
   sending a Short Message to the MS from the Hybrid Atrium; and
   ending a Short Message reply from the MS to the Hybrid Atrium.

4. The method of claim 1, further including updating the CN with a data session context update through the Hybrid Atrium.

5. The method of claim 1, wherein said facilitating an exchange of messages includes:
   receiving a termination request from the Base Station Controller (BSC) for the MS at the Hybrid Atrium;
   facilitating exchange of messages between the Hybrid Atrium and the CN to terminate the PPP connection; and
   facilitating termination of the PPP connection between the Hybrid Atrium and the MS.

6. The method of claim 1, wherein said facilitating an exchange of messages includes:
   receiving a termination request from the CN at the Hybrid Atrium;
   facilitating an exchange of messages between the Hybrid Atrium and the Base Station Controller for the MS to terminate the PPP connection; and
   terminating the PPP connection between the Hybrid Atrium and the MS.

7. The method of claim 1, wherein said facilitating an exchange of messages includes an ability to hand-off between Packet Data Service Nodes.

8. The method of claim 1, wherein said facilitating an exchange of messages includes an ability to hand-off between Serving General Packet Radio Service Serving Nodes.

9. The method of claim 1, wherein said facilitating an exchange of messages includes an ability to hand-off between a Packet Data Service Node and a Serving General Packet Radio Service Serving Node.

10. A system for providing data service in a hybrid network, wherein the hybrid network includes a Mobile Station (MS), a Radio Access Network (RAN) of a first technology and a Core Network (CN) of a second technology, the system comprising:
    a Hybrid Atrium located in the CN that enables exchanging messages from the MS and the RAN of a first technology to the CN of a second technology different than the first technology, wherein the Hybrid Atrium is a hybrid Serving GPRS Service Node and includes an ability to exchange short messages directly with the MS through a direct connection between the Hybrid Atrium and the MS and wherein the Hybrid Atrium is separate and apart from a Base Station Controller (BSC);
    wherein the Hybrid Atrium is configured to establish a Point to Point Protocol (PPP) connection directly between the Hybrid Atrium and the MS and to establish a user data transmission between the Hybrid Atrium and the MS.

11. The system of claim 10, wherein the exchanging the messages includes:
    the Base Station Controller in communications with the MS, wherein the Hybrid Atrium receives a data session initiation with the Hybrid Atrium from the MS through the Base Station Controller and wherein the Hybrid Atrium updates a Home Location Register (HLR) and wherein the HLR establishes a Quality of Service (QoS).

12. The system of claim 11, wherein the Hybrid Atrium sends a Short Message to the MS; and wherein the Hybrid Atrium receives a Short Message reply from the MS.

13. The system of claim 10, wherein the Hybrid Atrium facilitates the CN to be updated with a data session context update.

14. The system of claim 10, further including the Hybrid Atrium receives a termination request from the Base Station Controller (BSC) for the MS and wherein the Hybrid Atrium facilitates messages to be exchanged between the Hybrid Atrium and the CN to terminate the PPP connection and the PPP connection is terminated between the Hybrid Atrium and the MS.

15. The system of claim 10, wherein the Hybrid Atrium receives a termination request from the CN, the Hybrid Atrium facilitates messages to be exchanged between the Hybrid Atrium and the Base Station Controller for the MS to terminate the PPP connection, and the PPP connection is terminated between the Hybrid Atrium and the MS.

16. The system of claim 10, further including an ability to hand-off between Packet Data Service Nodes.

17. The system of claim 10, further including an ability to hand-off between Serving General Packet Radio Service Serving Nodes.

18. The system of claim 10, further including an ability to hand-off between a Packet Data Service Node and a Serving General Packet Radio Service Serving Node.

19. A Hybrid Atrium of a hybrid network, wherein the hybrid network includes a Mobile Station (MS), a Radio Access Network (RAN) of a first technology and a Core Network (CN) of a second technology, the Hybrid Atrium comprising:
an interface configured to communicate with components of the hybrid network; and
a processor configured to exchange messages, via the interface, between the MS and the RAN of a first technology and between the RAN of a first technology and the CN of a second technology different than the first technology, the processor configured to exchange short messages directly with the MS through a direct connection to the MS and exchange messages with a Serving General Packet Radio Service (GPRS) Serving Node, a Gateway GPRS Service Node, and a Packet Data Service Node, the processor further configured to employ the interface to establish a Point to Point Protocol (PPP) connection directly between the Hybrid Atrium and the MS, and a user data transmission between the Hybrid Atrium and the MS, wherein the Hybrid Atrium is separate and apart from a Base Station Controller (BSC) and operates as a hybrid Serving GPRS Service Node.

* * * * *